(12) United States Patent
Huang et al.

(10) Patent No.: US 9,534,544 B2
(45) Date of Patent: Jan. 3, 2017

(54) ELECTRIC HYBRID POWERTRAIN REGENERATION EFFICIENCY IMPROVEMENT

(71) Applicant: DENSO International America, Inc., Southfield, MI (US)

(72) Inventors: Zhe Huang, Farmington Hills, MI (US); Jonathan Logan, Walled Lake, MI (US); Nicholas Polcyn, Commerce, MI (US); Blaise Friery, Pleasant Prairie, WI (US)

(73) Assignees: Denso International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 219 days.

(21) Appl. No.: 14/228,321

(22) Filed: Mar. 28, 2014

(65) Prior Publication Data

US 2015/0275773 A1    Oct. 1, 2015

(51) Int. Cl.
F02D 29/02 (2006.01)
F02D 41/00 (2006.01)
F02D 41/12 (2006.01)

(52) U.S. Cl.
CPC ............. *F02D 29/02* (2013.01); *F02D 41/005* (2013.01); *F02D 41/0005* (2013.01); *F01N 2560/06* (2013.01); *F01N 2900/1626* (2013.01); *F02D 41/123* (2013.01); *F02D 2041/0017* (2013.01); *F02D 2200/0406* (2013.01); *F02D 2200/0802* (2013.01); *Y02T 10/42* (2013.01); *Y02T 10/47* (2013.01)

(58) Field of Classification Search
CPC ............ F02D 9/02; F02D 21/04; F02D 29/02; F02D 2009/0235; F02D 2009/0205; F01N 2560/06; F01N 2900/1626
USPC ............. 123/568.11, 568.19, 568.21, 568.22
See application file for complete search history.

(56) References Cited

U.S. PATENT DOCUMENTS

2003/0173123 A1*  9/2003  Nakanowatari .......... B60K 6/44
                                                  180/65.225
2005/0262827 A1* 12/2005  Ichimoto ................ B60K 6/445
                                                        60/277
2006/0086080 A1*  4/2006  Katogi .................... F01N 3/035
                                                        60/278

(Continued)

FOREIGN PATENT DOCUMENTS

EP        0849453 A2   6/1998
EP        1350937 A2  10/2003

(Continued)

*Primary Examiner* — Joseph Dallo
(74) *Attorney, Agent, or Firm* — Harness, Dickey & Pierce, P.L.C.

(57) ABSTRACT

A method and system for increasing regenerative energy available during deceleration by reducing engine pumping losses. The method includes a controller that reduces fuel delivery to the engine and closes an engine throttle during deceleration. The controller identifies the maximum kinetic energy available during deceleration and opens an exhaust gas recirculation (EGR) valve and engine throttle as necessary to reduce a vacuum in an engine intake manifold, thus minimizing engine pumping losses and increasing regenerative energy available during deceleration while ensuring that a catalyst temperature is above a catalyst temperature threshold.

19 Claims, 4 Drawing Sheets

(56) References Cited

U.S. PATENT DOCUMENTS

| | | | |
|---|---|---|---|
| 2006/0140780 A1 | 6/2006 | Stark | |
| 2008/0006024 A1* | 1/2008 | Tahara | F01N 3/0253 60/274 |
| 2008/0295514 A1* | 12/2008 | Ono | F01N 3/035 60/602 |
| 2010/0070122 A1* | 3/2010 | Niimi | B60K 6/445 701/22 |
| 2010/0256849 A1* | 10/2010 | Akimoto | B60K 6/445 701/22 |
| 2014/0288743 A1* | 9/2014 | Hokoi | B60W 20/40 701/22 |

FOREIGN PATENT DOCUMENTS

| | | |
|---|---|---|
| JP | H08100689 A | 4/1996 |
| JP | 8-112190 | 5/1996 |
| JP | H09284916 A | 10/1997 |

* cited by examiner

ELECTRIC HYBRID POWERTRAIN REGENERATION EFFICIENCY IMPROVEMENT

FIELD

The present disclosure relates to an electric hybrid powertrain regeneration efficiency improvement.

BACKGROUND

This section provides background information related to the present disclosure, which is not necessarily prior art.

Because of high fuel costs and government regulations, consumers increasingly require vehicles to be highly fuel-efficient. Hybrid-electric vehicles are considered to be an important system of increasing fuel efficiency. A typical hybrid-electric vehicle is equipped with an exhaust gas recirculation system that includes an engine operating in conjunction with a regenerative braking system to recharge a battery from the hybrid-electric vehicle's kinetic energy when the vehicle decelerates. Recharging the battery by the regenerative braking system increases fuel efficiency by converting kinetic energy to electricity. Therefore, the regenerative braking system increases the battery state of charge without requiring additional fuel and reduces the vehicle's speed without using a conventional brake, which also increases a vehicle's service life.

When the hybrid-electric vehicle decelerates, the regenerative braking system recharges the battery. When decelerating, the vehicle's wheels drive a motor generator so that kinetic energy of the vehicle is converted into electricity to recharge the battery. If the engine is rotated along with the motor generator, an energy recovery amount by the deceleration may be decreased due to an energy loss, in particular a pumping loss caused by a vacuum in the engine. A system that reduced the vacuum in the engine, while maintaining the vehicle's service life and catalyst temperature would thus be desirable.

SUMMARY

This section provides a general summary of the disclosure, and is not a comprehensive disclosure of its full scope or all of its features.

The present teachings include a method for increasing regenerative energy available during deceleration by reducing engine pumping losses. A controller reduces fuel delivery to an engine and closes a throttle during vehicle deceleration caused by a fuel-cut condition. The controller identifies the maximum kinetic energy available during deceleration and opens an exhaust gas recirculation (EGR) valve to reduce a vacuum in an intake manifold, thus minimizing engine pumping losses and increasing regenerative energy available during deceleration. The controller also identifies an intake pressure at the intake manifold after the EGR valve opens to determine if the intake pressure is above a manifold pressure target and simultaneously identifies a catalyst temperature to determine if the catalyst temperature is above a catalyst temperature threshold. If the intake pressure exceeds the manifold pressure target and the catalyst temperature is above the catalyst temperature threshold, the throttle opens to reduce the intake pressure below the manifold pressure target.

The present teachings further provide a method for increasing regenerative energy available during deceleration by reducing engine pumping losses by performing fuel-cut operations and determining if increasing regenerative energy is appropriate. If increasing regenerative energy is appropriate, then opening the EGR valve to reduce the vacuum in the intake manifold, thus minimizing engine pumping losses and increasing regenerative energy available during deceleration. If the intake pressure is above the manifold pressure target after the EGR valve opens, then determine if the catalyst temperature is above the catalyst temperature threshold. If the intake pressure exceeds the manifold pressure target, open the throttle to reduce the intake pressure below the manifold pressure target and maintain the catalyst temperature above the catalyst temperature threshold.

A system for increasing regenerative energy available during deceleration by reducing engine pumping losses, according to the present teachings, includes a recirculation manifold configured to direct exhaust gases from an exhaust manifold to an intake manifold. The system also includes an EGR valve at the recirculation manifold, which is configured to regulate exhaust gases flowing to the intake manifold from the exhaust manifold. The system includes a controller that is configured to perform fuel-cut operations during deceleration, identify the maximum kinetic energy available during deceleration, and open the EGR valve to reduce a vacuum in the intake manifold, thus minimizing engine pumping losses and increasing regenerative energy available during deceleration. The controller identifies the intake pressure at the intake manifold after the EGR valve opens to determine if the intake pressure is above the manifold pressure target. The controller also identifies the catalyst temperature after the EGR valve opens to determine if the catalyst temperature is above the catalyst temperature threshold. If the intake pressure exceeds the manifold pressure target and the catalyst temperature is above the catalyst temperature threshold, the controller opens the throttle to reduce the intake pressure below the manifold pressure target.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
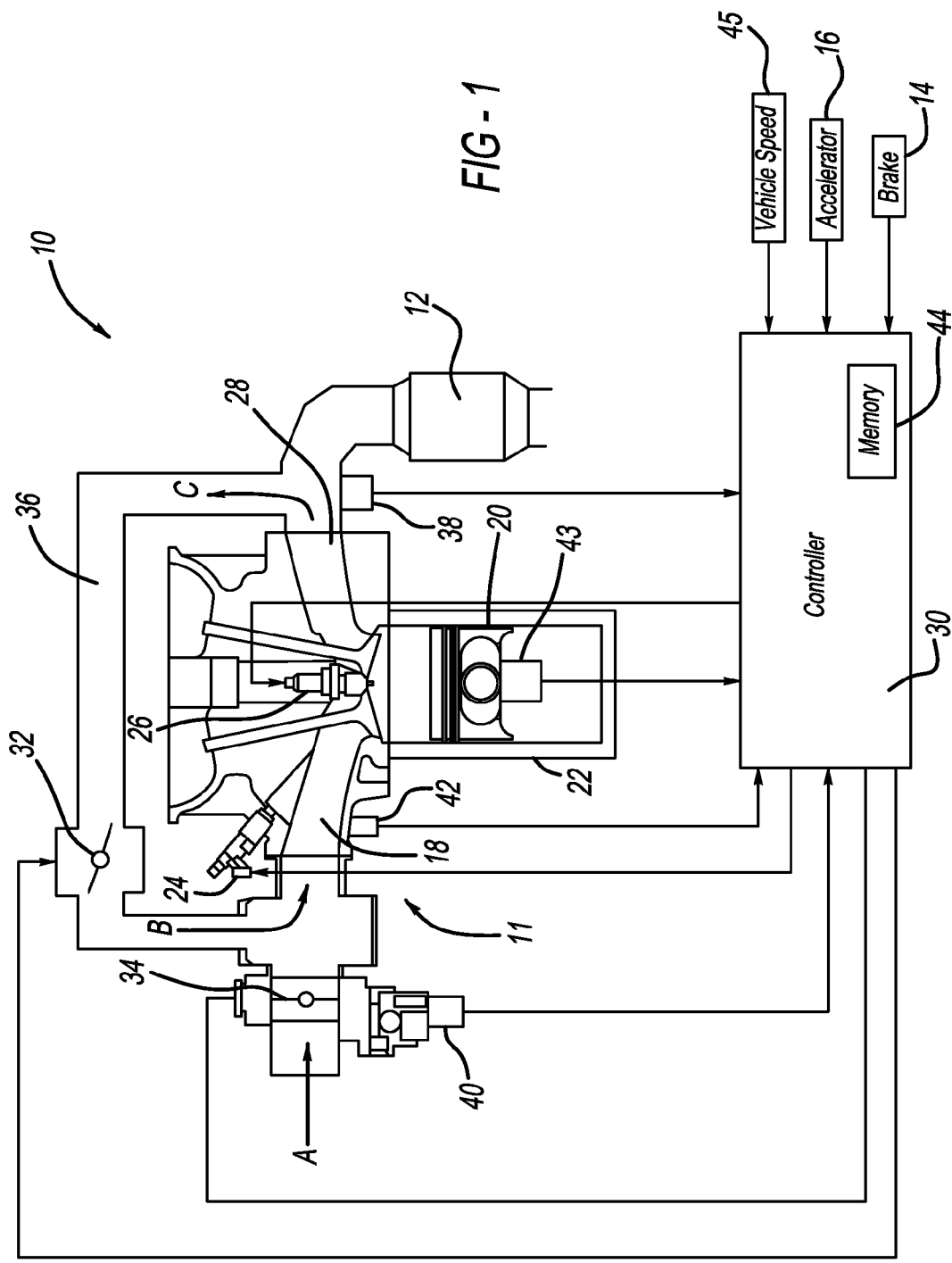
FIG. 1 is a schematic view of an exhaust gas recirculation system according to the present teachings.

A typical exhaust gas recirculation (EGR) system 10 is shown in FIG. 1. The EGR system 10 can be fitted onto an automobile engine, in particular an engine 11 of a hybrid-electric vehicle that includes a catalytic converter 12, a brake 14, and an accelerator 16. In general, the engine 11 includes an intake manifold 18, a piston 20, a cylinder 22, a fuel injector 24, a spark plug 26, and an exhaust manifold 28. The engine 11 operates in conjunction with a regenerative braking system to increase or recharge a state of charge of a battery from the hybrid-electric vehicle's kinetic energy during deceleration, as known in the art. The electric motors may also be known as a motor generator, which also may include a transmission (not shown).

The EGR system 10 includes a controller 30, EGR valve 32, throttle 34, sensors (described below), and a recirculation manifold 36. The recirculation manifold 36 is configured to direct exhaust gases from the exhaust manifold 28 according to direction C to the intake manifold 18 according to direction B. The controller 30 may be a vehicle controller, such as an engine control unit (ECU) or another control module.

The sensors may include an exhaust gas temperature sensor 38, a mass airflow sensor 40, a pressure sensor 42, an engine speed sensor 43, and a vehicle speed sensor 45. The mass airflow sensor 40 may be positioned proximate to the throttle 34, such as within the intake manifold 18, to detect a volume of air flowing therethrough. The pressure sensor 42 may be positioned in the intake manifold 18 to detect an intake pressure. The positions of the sensors 38, 40, 42, 43, and 45 are provided for exemplary purposes only. The sensors 38, 40, 42, 43, and 45 can be provided at any other suitable position throughout the EGR system 10 as well.

The exhaust gas temperature sensor 38 may be positioned in the exhaust manifold 28 to detect an exhaust gas temperature. The exhaust gas temperature may be determined by other methods, such as estimation by the controller 30 with an exhaust gas temperature model. The controller 30 may use a number of inputs into the exhaust temperature model, such as a temperature of the fresh air, engine speed, and vehicle speed, as is known in the art.

The exhaust gas temperature sensor 28 may be positioned at any other suitable position, such as near the catalytic converter 12. Therefore, the exhaust gas temperature may also be a catalyst temperature. However, the controller 30 may also estimate the catalyst temperature with a catalyst temperature model. The controller 30 may use a number of inputs into the catalyst temperature model, such as the exhaust gas temperature, engine speed, and vehicle speed, as is known in the art. For example, for a larger vehicle speed, the catalyst temperature may be lower because fresh air passing under the hybrid-electric vehicle may cool the catalytic converter 12.

The throttle 34 is configured to regulate airflow into an intake manifold 18. The throttle 34 may be of any suitable type, such as a dedicated butterfly valve or a throttle-less valve system, such as a variable valve lift system. The throttle 34 regulates air flowing through the mass airflow sensor 40 in direction A into the intake manifold 18. Likewise, the EGR valve 32 may be a butterfly valve disposed in the recirculation manifold 36 to regulate exhaust gases flowing to the intake manifold 18 according to direction B from the exhaust manifold 28 according to direction C.

The controller 30 is in communication with the sensors 38, 40, 42, 43, and 45, throttle 34, and EGR valve 32. For example, the sensors 38, 40, 42, 43, and 45 send signals to the controller 30, and the EGR valve 32 and throttle 34 receive signals from the controller 30. Therefore, the controller 30 receives an intake pressure signal from the pressure sensor 42, and an exhaust gas temperature signal from the exhaust gas temperature sensor 38. The controller 30 is also in communication with the brake 14 and the accelerator 16. Therefore, the controller 30 is configured to perform fuel-cut operations when a fuel-cut condition occurs, as described below.

Fuel-cut operations include stopping or limiting combustion in the cylinder 22 by stopping or limiting fuel flow through the fuel injector 24 and closing the throttle 34. However, piston 20 still pumps during the fuel-cut condition. The piston 20 pumps air from the intake manifold 18 to the exhaust manifold 28. The intake manifold 18 becomes a vacuum that resists the pumping of piston 20 since throttle 34 restricts the flow of fresh air into the intake manifold 18 along direction A. The piston 20 uses energy from the engine 11, known as pumping loss, to overcome the vacuum. Therefore, energy lost due to pumping loss cannot be recovered by the regenerative braking system to recharge the battery of the hybrid-electric vehicle.

Based on signals from the sensors, such as an intake pressure sensor 42 and exhaust gas temperature sensor 38 or catalyst temperature model, the controller 30 is configured operate the EGR valve 32. Opening the EGR valve 32 allows exhaust gas from the exhaust manifold 28 flowing through the recirculation manifold 36 to pass to the intake manifold 18 according to direction B to reduce a vacuum in the intake manifold 18. Therefore, engine pumping losses are minimized and an catalyst temperature (CT) threshold is maintained. The EGR valve 32, therefore, may have a diameter that is small, such that durability, spatial design, and control precision are increased and manufacturing costs are reduced.

Based on further signals from the sensors, such as the exhaust gas temperature sensor 38 or exhaust gas temperature model (as described above), and the intake pressure sensor 42, the controller 30 is configured to operate the throttle 34. Opening the throttle 34 allows an amount of fresh air to flow according to direction A into the intake manifold 18 to further reduce a vacuum in the intake manifold 18.

Therefore, the controller 30 operates throttle 34 and EGR valve 32 together. Engine pumping losses are thus minimized without requiring throttle 34 to have a large diameter such that durability, spatial design, and control precision are reduced and manufacturing costs are increased. Furthermore, the EGR system 10 does not require EGR valve 32 to have a large diameter, which likewise limits the reduction of the EGR valve's 32 durability, spatial design, and control precision. Likewise, frequently operating the throttle 34 would reduce the throttle's 34 durability.

The temperature of the fresh air is generally lower than the exhaust gas from the exhaust manifold 28. If too much fresh air flows through the intake manifold 18 in direction A during a fuel-cut condition, the fresh air may cause the catalyst temperature to fall below the catalyst temperature threshold so the catalytic converter 12 may not function efficiently. Therefore, use of exhaust gas from the exhaust manifold 28 according to directions B and C is advantageous to using fresh air in direction A for reducing a vacuum in the intake manifold 18.

The EGR valve 32 may be arranged in a variety of positions, such as fully open, fully closed, or at any position therebetween, such as at an EGR valve opening percentage (P_egr). The throttle 34 may have many positions, such as fully open, fully closed, or at any position therebetween, such as at a throttle opening percentage (P_thr). Furthermore, the throttle 34 may also have a throttle opening duration (T_thr). The EGR valve position, throttle position, and throttle opening duration are determined by the controller 30, as described below.

Figure 9:
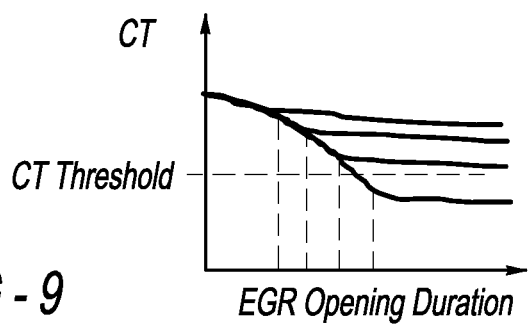
FIG. 9 is a diagram illustrating relationship of the EGR valve opening duration and the catalyst temperature for a number of throttle opening percentages.

Alternatively, since the controller 30 determines when a fuel-cut condition occurs, it is also configured to initially open the throttle 34 and EGR valve 32 to reduce the vacuum in the intake manifold 18. The controller 30 may receive the exhaust gas temperature signal from the exhaust gas temperature sensor 38, or, for example, the catalyst temperature from the catalyst temperature model, and the intake pressure signal from the intake pressure sensor 42 to determine the EGR valve opening percentage and an EGR valve opening duration to maintain the catalyst temperature above the catalyst temperature threshold. For example, FIG. 9 shows how controller 30 determines the EGR valve opening duration based on the catalyst temperature, including the catalyst temperature threshold, for a number of EGR valve opening percentages.

The controller 30 may further include memory 44. The memory 44 may store values in the form of, for example, look-up tables, algorithms, and optimum operating values, for the EGR system 10. For example, the values may include an optimal throttle opening percentage, an optimal EGR valve opening percentage, and an optimal maximum throttle opening duration. The look-up tables may be used to store and determine combinations of values or a combination of optimum operating values. For example, the memory 44 may store a look-up table that describes a combination of throttle opening duration, EGR valve opening percentage, and throttle opening percentage based on the vehicle speed and exhaust gas temperature or catalyst temperature.

Likewise, the memory 44 may store a look-up table that describes a combination of throttle opening duration, EGR valve opening percentage, and throttle opening percentage based on a spark plug ignition energy and engine speed from the engine speed sensor 43. Finally, the values and look-up tables may be stored in the controller 30 as an algorithm that produces the desired values based on relationships, such as in FIGS. 4-9, which are described herein.

Figure 2:
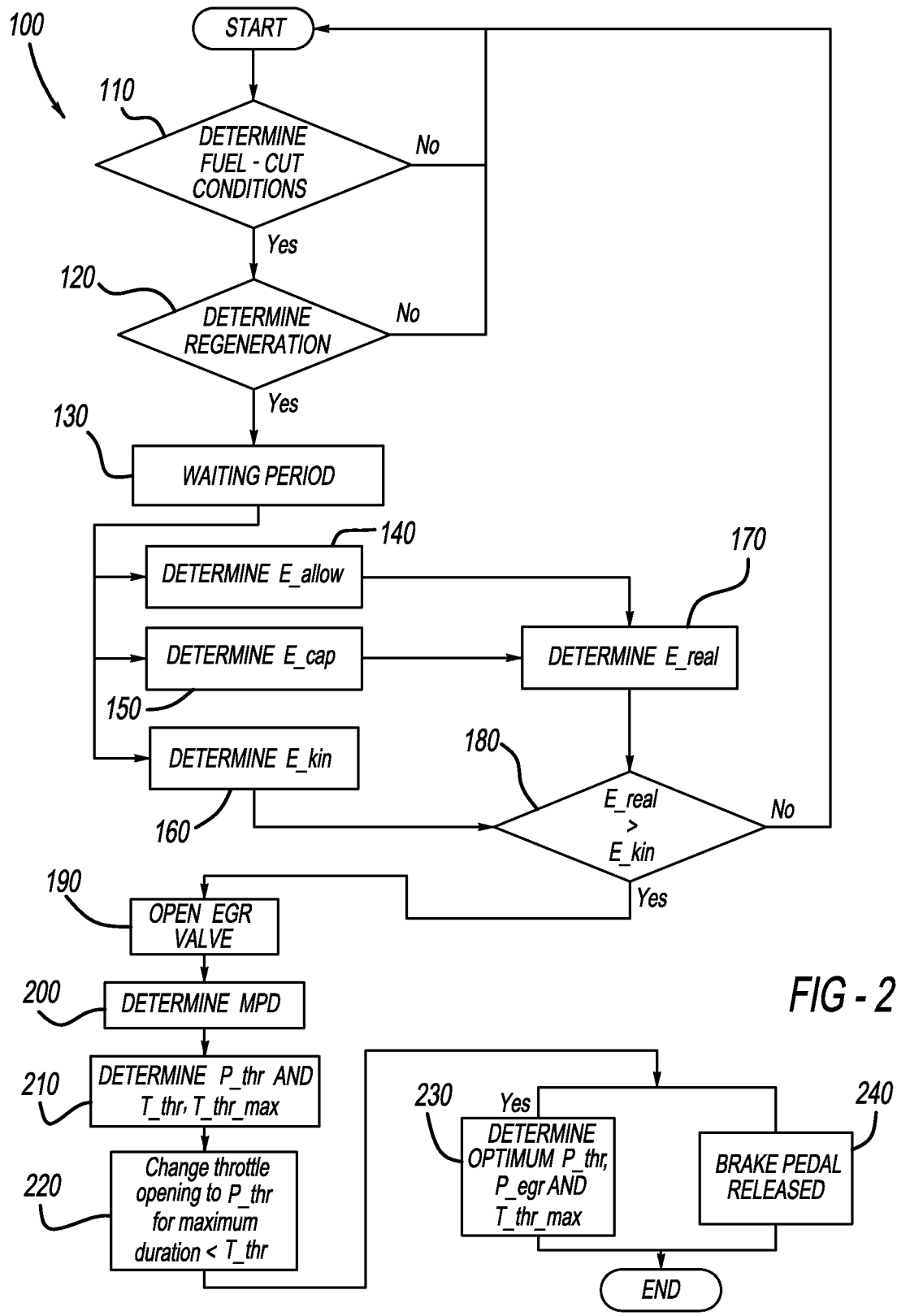
FIG. 2 is a flowchart for operation of an exhaust gas recirculation system according to the present teachings.
Figure 3:
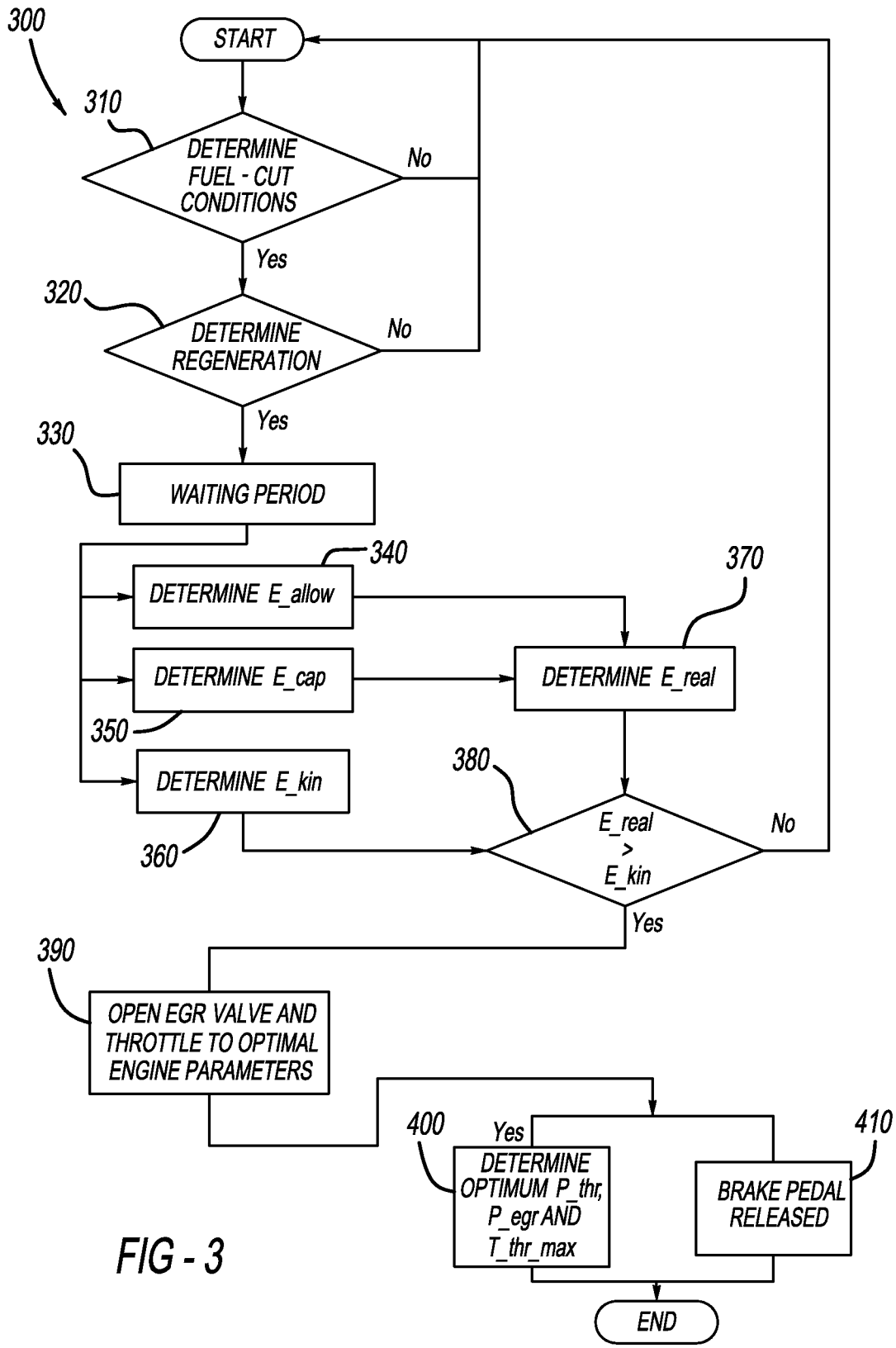
FIG. 3 is a flowchart for another operation of an exhaust gas recirculation system according to the present teachings.

The EGR system 10 according to the present teachings can be operated according to a first control method 100 (FIG. 2), or a second control method 300 (FIG. 3). For vehicles that have energy regeneration systems, such as hybrid-electric vehicles, the control method 100 or 300 may be implemented by the controller 30 to increase the regenerative energy available while the vehicle decelerates by reducing engine pumping losses. Pumping losses occur due to a vacuum at the intake manifold 18 when the controller 30 closes the throttle 34, as described above.

Energy regeneration systems, also known as regenerative braking systems, recover kinetic energy in the form of vehicle speed during vehicle deceleration to recharge the battery. Vehicle deceleration, for example, may be caused by the driver disengaging the accelerator 16 or engaging the brake 14, such as a mechanical or hydraulic brake. Disengaging the accelerator 16 or engaging the brake 14 are examples of fuel-cut operations that the controller 30 may use as indicators that the vehicle will be decelerating and that energy regeneration may be possible.

Referring now to FIG. 2 and initially to Block 110, the method 100 includes determining fuel-cut conditions, typically initiated by a driver. The controller 30 may reduce the amount of fuel delivered to the engine 11 and may close or reduce the throttle opening percentage of throttle 34 when fuel-cut conditions are initiated, such as when the driver applies the brake 14. Depending on the vehicle and the controller 30, the controller 30 may reduce or stop the fuel delivered to the engine 11 or certain cylinders 22. Likewise, the controller 30 may close or constrict the throttle 34 to the engine 11 or certain cylinders 22. Referring to Block 120, the controller 30 will indicate if the regenerative energy system can recover energy to recharge the battery.

Referring to Block 130, the EGR system 10 may pause for a wait period to ensure that the engine 11 will respond during a shortened deceleration situation, such as if the driver changes his or her mind regarding braking in a change-of-mind situation. The change-of-mind situation may be when the driver begins to decelerate the vehicle, but then quickly decides to accelerate. During a change-of-mind situation, the driver would begin to decelerate and the controller 30 would begin fuel-cut operations. The EGR valve 32 would open to allow exhaust gas to flow into the intake manifold 18 according to direction B and direction C, as pumped by the piston 20. When the concentration of exhaust gas in the cylinder 22 reaches an ignition threshold, the engine 11 may hesitate upon acceleration. Hesitation is undesired because the vehicle may accelerate at a rate less than desired by the driver.

To avoid hesitation the EGR system 10 may pause for a wait period. The wait period has a duration that depends on many factors, such as engine speed (RPM) and the spark plug ignition energy of the spark plug 26. For example, the piston 20 will be able to remove exhaust gas by pumping at a rate proportional to the engine speed. Therefore, exhaust gas can be more quickly removed from the cylinder 22 when the engine speed is high than when the engine speed is low, and the wait period duration will be short. In addition, if the spark plug ignition energy is high, the spark plug 26 may be able to overcome the concentration of exhaust gas in the cylinder 22 to perform combustion, reducing the need to remove exhaust gas by pumping from the piston 20, and the wait period duration will be short.

The controller 30 may also determine whether to operate the EGR valve 32. This determination may depend on several factors. For example, the controller 30 may determine that frequently operating the EGR valve 32 reduces the durability of the EGR valve 32. To reduce wear and improve durability of the EGR valve 32, the controller may determine whether the EGR system 10 may require a real energy value, or a minimum energy value, for regeneration. As a further example, referring to Block 140, the EGR system 10 may determine an amount of energy allowed to be regenerated (E_allow). Determining E_allow depends on a state of charge of the battery (FIG. 5) and a temperature sensor signal from components of the motor generator (FIG. 6) or battery. For example, E_allow may be low to avoid damaging the battery with high current input. As a further example, E_allow may be lower when the motor has a high temperature to avoid damaging the motors.

Referring to Block 150, the controller 30 may determine the amount of energy the regenerative braking system is capable of regenerating (E_cap). This amount may be based on an amount of regenerative energy capable from braking.

The amount of regenerative energy capable from braking may be limited by the vehicle's rate of deceleration before wheel slip or an anti-lock braking system. Furthermore, E_cap may also be based on nominal motor generator parameters and nominal battery parameters.

Figure 4:
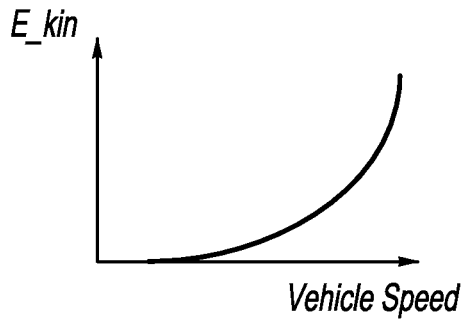
FIG. 4 is a diagram illustrating relationship of vehicle speed and available kinetic energy.
Figure 5:
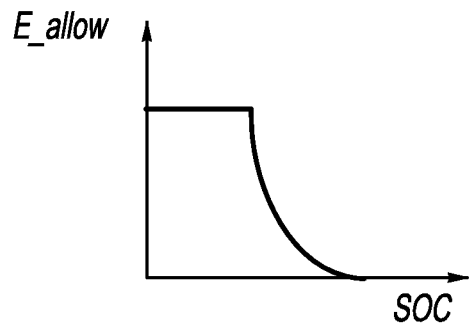
FIG. 5 is a diagram illustrating relationship of the battery's state of charge and allowable regeneration energy.
Figure 6:
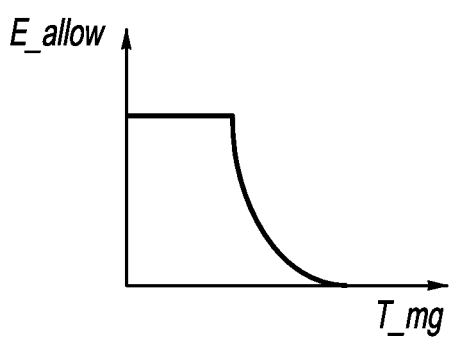
FIG. 6 is a diagram illustrating relationship of the motor generator (MG) temperature and allowable regeneration energy.

Likewise, referring to Block 160, the controller 30 may determine the amount of kinetic energy available (E_kin) to be regenerated. Determining E_kin depends on a relationship between the vehicle speed and kinetic energy. As shown in FIG. 4, kinetic energy increases with vehicle speed. Therefore, E_kin will be larger for a larger vehicle speed.

Referring to Block 170, the controller 30 will determine E_real, which is the real amount of energy that the energy generation system is capable of regenerating. For example, E_real is based on the minimum of E_allow and E_cap. Referring to Block 180, the controller 30 will determine if E_real is less than E_kin. If E_real is less than E_kin, the energy regeneration system may recover the minimum energy value without the EGR system 10 and controller 30 may indicate that the brake 14 may be required to further reduce vehicle speed, if desired. If E_real is greater than E_kin, controller 30 will determine a manifold pressure target that corresponds to the minimum energy value to reduce pumping losses without causing engine hesitation. The controller 30 may also use parameters, such as the spark plug ignition energy, engine speed, starting exhaust gas temperature, and starting vehicle speed, stored in the memory 44 to determine the manifold pressure target.

Alternatively, the controller 30 may also consider that the EGR system 10 is not affected by wear and durability of operating the EGR valve 32. Therefore, the controller 30 does not determine E_real. Referring to Block 190, the EGR system 10 will recover the available kinetic energy during deceleration by opening the EGR valve 32 to reduce a vacuum in the intake manifold 18, thus minimizing engine pumping losses and increasing regenerative energy available during deceleration.

Referring to Block 190, the EGR system 10 will recover the available kinetic energy during deceleration by opening the EGR valve 32 to reduce a vacuum in the intake manifold 18, thus minimizing engine pumping losses and increasing regenerative energy available during deceleration. Referring to Block 200, the controller 30, by the pressure sensor 42, will identify the intake pressure in the intake manifold 18 to determine a manifold pressure difference (MPD), which is the difference between the manifold pressure target and the intake pressure. The controller 30, by the exhaust gas temperature sensor 38 or catalyst temperature model, will also identify the catalyst temperature to determine if the catalyst temperature is above the catalyst temperature threshold.

Figure 7:
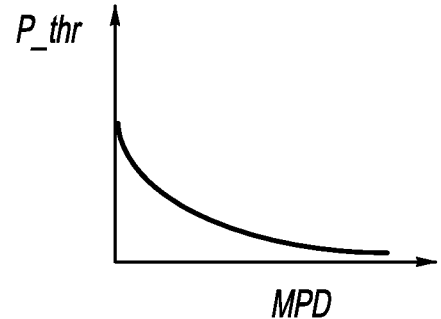
FIG. 7 is a diagram illustrating relationship of the manifold pressure difference and the throttle open percentage.

FIG. 7 shows the relationship between the manifold pressure difference and the EGR throttle percentage. In particular, the controller 30 will operate EGR valve opening percentage lower as the manifold pressure difference increases.

Referring to Block 210, if the intake pressure exceeds the manifold pressure target and the catalyst temperature is above the catalyst temperature threshold, the controller 30 will open the throttle 34 to the throttle opening percentage and for the throttle opening duration to reduce the intake pressure below the manifold pressure target, while maintaining the catalyst temperature above the catalyst temperature threshold. Referring to Block 220, the controller 30 may determine the throttle opening percentage and the throttle opening duration based on values stored in the memory 44, or based on a look-up table. The values and the look-up table may depend on, for example, the spark plug ignition energy, engine speed, starting exhaust gas temperature, and starting vehicle speed.

Figure 8:
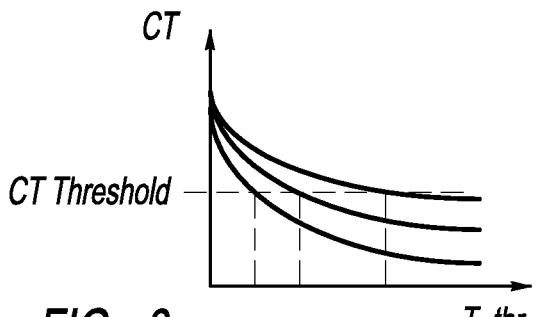
FIG. 8 is a diagram illustrating relationship of the throttle open duration and the catalyst temperature for given throttle open percentages.

FIG. 8 shows the relationship between the throttle opening duration and the catalyst temperature for a number of EGR valve opening percentages. In particular, FIG. 8 includes the catalyst temperature threshold that the controller 30 must maintain for each EGR valve opening percentage. Therefore, controller 30 determines the throttle opening duration and EGR valve percentage to maintain the catalyst temperature above the catalyst temperature threshold.

Alternatively, the controller 30 may determine to initially open the throttle 34 and EGR valve 32 when a fuel-cut condition occurs to reduce the vacuum in the intake manifold 18. The controller 30 may receive the exhaust gas temperature signal from the exhaust gas temperature sensor 38, or the catalyst temperature from the catalyst temperature model, and the intake pressure signal from the intake pressure sensor 42 to determine the EGR valve opening percentage and an EGR valve opening duration to maintain the catalyst temperature above the catalyst temperature threshold. FIG. 9 shows how controller 30 determines the relationship between the EGR valve opening duration and the catalyst temperature, including the catalyst temperature threshold, for a number of EGR valve opening percentages.

Referring to Block 230 and Block 240, the controller 30 will operate the EGR valve 32 and throttle 34 according to the throttle opening percentage and the EGR valve opening percentage until the controller 30 determines that the fuel-cut condition has ended. For example, the fuel-cut condition may end when the driver releases the brake 14, engages the accelerator 16, or the controller 30 determines that the combination of parameters may cause engine hesitation.

Referring now to FIG. 3 and initially to Block 310, the method 300 includes determining fuel-cut conditions, typically initiated by a driver, will now be described. The controller 30 will store the vehicle speed and catalyst temperature in memory 44 when the fuel-cut condition begins. The controller 30 may reduce or stop fuel delivered to the engine 11 and may close throttle 34. Depending on the vehicle and the controller 30, the controller 30 may reduce or stop the fuel delivered to the entire engine 11 or certain cylinders 22. Likewise, the controller 30 may close or constrict the throttle 34 to the entire engine 11 or certain cylinders 22. Referring to Block 320, the controller 30 will indicate if the regenerative energy system can recover energy to recharge the battery.

Referring to Block 330, the EGR system 10 may pause for a wait period to ensure that the engine 11 will respond during a shortened deceleration situation, such as a change-of-mind situation. The change-of-mind situation may be when the driver begins to decelerate the vehicle, but then quickly decides to accelerate. During the change-of-mind situation, the driver would begin to decelerate the vehicle and controller 30 would begin fuel-cut operations. The EGR valve 32 would open to allow exhaust gas to flow into the intake manifold 18 according to direction B and direction C, as pumped by the piston 20. When the concentration of exhaust gas in the cylinder 22 reaches an ignition threshold, the engine 11 may hesitate upon acceleration. Hesitation is undesired because the vehicle may accelerate at a rate less than desired by the driver.

To avoid hesitation the EGR system 10 will pause for a wait period. The wait period has a duration that depends on many factors, such as engine speed (RPM) and the spark plug ignition energy of the spark plug 26. For example, the piston 20 will be able to remove exhaust gas by pumping at a rate proportional to the engine speed. Therefore, exhaust gas can be more quickly removed from the cylinder 22 when the engine speed is high than when the engine speed is low, and the wait period duration will be low. In addition, if the spark plug ignition energy is high, the spark plug 26 may be able to overcome the concentration of exhaust gas in the cylinder 22 to perform combustion, reducing the need to remove exhaust gas by pumping from the piston 20, and the wait period duration will be short.

The controller 30 may also determine whether to operate the EGR valve 32. This determination may depend on several factors. For example, referring to Block 340, the EGR system 10 may determine an amount of energy allowed to be regenerated (E_allow). Determining E_allow depends on the state of charge of the battery (FIG. 5) and a temperature sensor signal from components of the motor generator (FIG. 6) or battery. For example, E_allow may be low to avoid damaging the battery with high current input. As a further example, E_allow may be lower when the motor has a high temperature to avoid damaging the motors.

Referring to Block 350, the controller 30 may determine the amount of energy the regenerative braking system is capable of regenerating (E_cap). This amount may be based on an amount of regenerative energy capable from braking. The amount of regenerative energy capable from braking may be limited by the vehicle's rate of deceleration before wheel slip or an anti-lock braking system. Furthermore, controller 30 may determine E_cap based on nominal motor generator parameters and nominal battery parameters.

Likewise, referring to Block 360, the controller 30 may determine the amount of kinetic energy available (E_kin) to be regenerated (Block 360). Determining E_kin depends on a relationship between the vehicle speed and kinetic energy. As shown in FIG. 4, kinetic energy increases with vehicle speed. Therefore, E_kin will be larger for a larger vehicle speed.

The controller 30 will determine whether, based on the factors E_allow, E_cap, and E_kin, the EGR system 10 must reduce pumping losses so that the energy regeneration system can maximize energy regeneration. Referring to Block 370, the controller 30 will determine E_real, which is the real amount of energy that the energy generation system is capable of regenerating. For example, E_real is based on the minimum of E_allow and E_cap. Referring to Block 380, the controller 30 will determine if E_real is less than E_kin. If E_real is less than E_kin, the energy regeneration system may recover the minimum energy value without the EGR system 10 and controller 30 may indicate that the brake 14 may be required to further reduce vehicle speed, if desired.

The controller 30 will also determine a manifold pressure target that corresponds to the minimum energy value to reduce pumping losses without causing engine hesitation. The controller 30 may also use parameters, such as the spark plug ignition energy, engine speed, starting exhaust gas temperature, and starting vehicle speed, stored in the memory to determine the manifold pressure target. Referring to Block 390, if E_real is greater than E_kin, the EGR system 10 will recover the available kinetic energy during deceleration by opening the EGR valve 32 and throttle 34 to reduce a vacuum in the intake manifold 18, thus minimizing engine pumping losses and increasing regenerative energy available during deceleration. The controller 30 will also retrieve optimal engine parameters, such as an optimal EGR valve opening percentage, an optimal throttle opening percentage, and an optimal throttle opening duration from the memory 44. The controller 30 determines the optimal engine parameters based on the vehicle speed and catalyst temperature when the fuel-cut condition begins. The optimal engine parameters are determined to ensure that the intake pressure reaches the manifold pressure target and the catalyst temperature remains above the catalyst temperature threshold.

Using the optimal engine parameters, the EGR system 10 will recover available kinetic energy during deceleration by opening the EGR valve 32 to the optimal EGR valve percentage to reduce the vacuum in the intake manifold 18, thus minimizing engine pumping losses and increasing regenerative energy available during deceleration. The controller 30 will also open the throttle 34 to the optimal throttle opening percentage and for the optimal throttle opening duration to reduce the intake pressure to the manifold pressure target, while maintaining the catalyst temperature above the catalyst temperature threshold.

The controller 30 will operate the EGR valve 32 and throttle 34 with the optimal throttle opening percentage and the optimal EGR valve opening percentage until the controller 30 determines that the fuel-cut condition has ended. For example, referring to Block 400 and Block 410, the fuel-cut condition may end when the driver releases the brake 14, engages the accelerator 16, or the controller 30 determines that the combination of optimal engine parameters may cause engine hesitation.

Thus, the present teachings generally provide methods and devices for increasing regenerative energy available during deceleration by reducing engine pumping losses. The methods and devices generally reduce fuel delivery to an engine and close a throttle during vehicle deceleration and fuel-cut conditions. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A method for increasing regenerative energy available during deceleration by reducing engine pumping losses, the method comprising:
   reducing fuel delivery to an engine during deceleration;
   closing an engine throttle during deceleration;
   opening an exhaust gas recirculation (EGR) valve during deceleration to reduce a vacuum in an engine intake manifold during deceleration, thus minimizing engine pumping losses and increasing regenerative energy available during deceleration;
   identifying an intake pressure at the engine intake manifold during deceleration after the EGR valve opens to determine if the intake pressure is above a determined manifold pressure target during deceleration;

identifying a catalyst temperature during deceleration after the EGR valve opens to determine if the catalyst temperature is above a catalyst temperature threshold during deceleration; and opening the engine throttle and the EGR valve during deceleration to reduce the intake pressure below the manifold pressure target during deceleration if the intake pressure exceeds the manifold pressure target and the catalyst temperature is above the catalyst temperature threshold.

2. The method of claim 1 further comprising determining the manifold pressure target based on vehicle parameters stored in a controller.

3. The method of claim 1, wherein the controller stores the manifold pressure target.

4. The method of claim 3, wherein the controller determines if the intake pressure is above the stored determined manifold pressure target.

5. The method of claim 1, wherein opening the engine throttle further comprises determining a throttle opening percentage and a throttle opening duration.

6. The method of claim 5, wherein determining the throttle opening percentage and the throttle opening duration is based on vehicle parameters stored in a controller.

7. The method of claim 5, wherein the controller stores an optimal throttle opening percentage and an optimal throttle opening duration.

8. The method of claim 1, further comprising identifying maximum kinetic energy available during deceleration.

9. A method for increasing regenerative energy available during deceleration by reducing engine pumping losses, the method comprising:

performing fuel-cut operations including reducing fuel delivery to an engine during deceleration and closing an engine throttle during deceleration;

opening an exhaust gas recirculation (EGR) valve during deceleration to reduce a vacuum in an engine intake manifold, thus minimizing engine pumping losses and increasing regenerative energy available during deceleration;

determining if an intake pressure in the engine intake manifold is above a determined manifold pressure target after the EGR valve opens during deceleration;

determining if a catalyst temperature is above a catalyst temperature threshold during deceleration; and if the intake pressure exceeds the manifold pressure target, opening the engine throttle and the EGR valve during deceleration to reduce the intake pressure below the manifold pressure target and maintain the catalyst temperature above the catalyst temperature threshold during deceleration.

10. The method of claim 9, wherein performing fuel-cut operations includes detecting a fuel-cut status, the fuel-cut status determining whether fuel-cut is appropriate.

11. The method of claim 10, wherein detecting a fuel-cut status includes determining if a brake is applied and determining if deceleration is required.

12. The method of claim 9, further comprising determining if increasing regenerative energy is appropriate by:

determining amount of allowable regeneration energy;

determining regeneration energy capability; and determining amount of available regeneration energy.

13. The method of claim 9, wherein the catalyst temperature threshold is equal to a minimum catalyst temperature for operating a catalytic converter.

14. The method of claim 9, wherein opening the engine throttle is determined by referencing a set of pre-determined tables stored in a controller, the values including a throttle open angle, an EGR valve open angle, and a maximum throttle opening duration.

15. The method of claim 9, wherein opening the engine throttle is determined by referencing optimum values stored in a controller, the optimum values including an optimal throttle open angle, an optimal EGR valve open angle, and an optimal maximum throttle opening duration.

16. A system for increasing regenerative energy available during deceleration by reducing engine pumping losses, the system comprising:

a return manifold configured to direct exhaust gas from an engine exhaust manifold to an engine intake manifold during deceleration;

an EGR valve at the return manifold, the EGR valve configured to regulate flow of exhaust gas to the engine intake manifold from the engine exhaust manifold of an engine during deceleration; and a controller configured to:

perform fuel-cut operations during deceleration including reducing fuel delivery to the engine during deceleration and closing an engine throttle during deceleration;

identify a maximum kinetic energy available during deceleration;

open the exhaust gas recirculation (EGR) valve during deceleration to reduce a vacuum in the engine intake manifold, thus minimizing engine pumping losses and increasing regenerative energy available during deceleration;

identify an intake pressure at the engine intake manifold during deceleration after the EGR valve opens to determine if the intake pressure is above a determined manifold pressure target during deceleration; and identify a catalyst temperature during deceleration after the EGR valve opens to determine if the catalyst temperature is above a catalyst temperature threshold during deceleration; and if the intake pressure exceeds the manifold pressure target and the catalyst temperature is above the catalyst temperature threshold, opening the engine throttle and the EGR valve during deceleration to reduce the intake pressure below the manifold pressure target during deceleration.

17. The system of claim 16, wherein the throttle is configured to regulate fresh air flowing into the engine intake manifold.

18. The system of claim 17, further comprising an exhaust gas temperature sensor, a mass airflow sensor, and a pressure sensor.

19. The system of claim 17, wherein the controller comprises a memory, the memory configured to store optimum EGR values including an optimal throttle open angle, an optimal EGR valve open angle, and an optimal maximum throttle opening duration.

* * * * *